(12) United States Patent
Watanabe

(10) Patent No.: US 10,762,363 B2
(45) Date of Patent: Sep. 1, 2020

(54) ROAD SIGN RECOGNITION FOR CONNECTED VEHICLES

(71) Applicant: TOYOTA JIDOSHA KABUSHIKI KAISHA, Toyota-shi, Aichi-ken (JP)

(72) Inventor: Kosuke Watanabe, Toyota (JP)

(*) Notice: Subject to any disclaimer, the term of this patent is extended or adjusted under 35 U.S.C. 154(b) by 231 days.

(21) Appl. No.: 15/941,328

(22) Filed: Mar. 30, 2018

(65) Prior Publication Data
US 2019/0303693 A1   Oct. 3, 2019

(51) Int. Cl.
| | | |
|---|---|---|
| *G06K 9/00* | (2006.01) | |
| *H04W 4/46* | (2018.01) | |
| *G05D 1/02* | (2020.01) | |
| *G08G 1/0967* | (2006.01) | |
| *H04W 4/44* | (2018.01) | |

(52) U.S. Cl.
CPC ....... *G06K 9/00818* (2013.01); *G05D 1/0276* (2013.01); *G05D 1/0287* (2013.01); *G08G 1/096791* (2013.01); *H04W 4/44* (2018.02); *H04W 4/46* (2018.02)

(58) Field of Classification Search
CPC ...... G06K 9/00818; H04W 4/46; H04W 4/44; H04W 4/48; H04W 4/046; G05D 1/0276; G05D 1/0287; G08G 1/166; G08G 1/096791

USPC .......................................................... 382/181
See application file for complete search history.

(56) References Cited

U.S. PATENT DOCUMENTS

| | | | |
|---|---|---|---|
| 9,646,428 B1 * | 5/2017 | Konrardy ............... G08G 1/164 |
| 10,185,998 B1 * | 1/2019 | Konrardy ............... G06Q 40/08 |
| 10,395,332 B1 * | 8/2019 | Konrardy .......... G06F 16/90335 |
| 10,529,221 B2 * | 1/2020 | Jarrell ..................... H04W 4/70 |
| 2017/0008521 A1 * | 1/2017 | Braunstein ........... G01O 21/165 |
| 2017/0305434 A1 * | 10/2017 | Ratnasingam ......... B60K 35/00 |
| 2018/0075538 A1 * | 3/2018 | Konrardy ............... G06Q 40/08 |
| 2018/0202822 A1 * | 7/2018 | DeLizio ............. G01O 21/3407 |
| 2019/0278275 A1 * | 9/2019 | Song ...................... G08G 1/165 |

FOREIGN PATENT DOCUMENTS

| | | |
|---|---|---|
| JP | POH07-085400 | 3/1995 |
| JP | PO2015-011457 | 1/2015 |

* cited by examiner

*Primary Examiner* — Ali Bayat
(74) *Attorney, Agent, or Firm* — Burbage Law, P.C.; Jon-Michael Burbage; Elizabeth Ruzich

(57) ABSTRACT

The disclosure includes embodiments for providing road sign recognition for connected vehicles. In some embodiments, a method includes determining that a first set of first vehicles have assessed by that a content for a road sign is a first value. In some embodiments, the method includes determining that the content for the road sign is a second value assessed by a second set of second vehicles based, at least in part, on the first vehicles having a same make and model.

20 Claims, 6 Drawing Sheets

BSM DATA 197

- Vehicles and other client devices equipped with Dedicated Short Range Communication ("DSRC") transmit a Basic Safety Message ("BSM") at a regular interval.

- Each BSM includes the following BSM data describing one or more of the following for the vehicle that originally sent the BSM:
    (1) GPS Data Describing the Location of the Vehicle, where the GPS Data may be so accurate that it describes the specific parking space the Vehicle is parked in;
    (2) Heading Data Describing a past Direction of travel for the Vehicle, if any;
    (3) Velocity Data Describing a past Velocity of the Vehicle; and
    (4) Path History of Vehicle (e.g., path history data).

Figure 5

BSM DATA 197

Part 1
GPS Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type
The number of signs data 192B, content data 193B and vehicle ID data 194B.

Figure 6

ROAD SIGN RECOGNITION FOR CONNECTED VEHICLES

BACKGROUND

The specification relates to providing road sign recognition for connected vehicles.

Image recognition is frequently inaccurate. This is potentially a fatal problem when image recognition is used for vehicular applications. For example, if image recognition is used to determine the content of a road sign, then an Advanced Driving Assistance System (ADAS system) of a vehicle may make a fatal operating decision for the vehicle because the image recognition result is inaccurate.

SUMMARY

Described herein are embodiments of a road sign system that is installed in an onboard vehicle computer system of a connected vehicle. The road sign system is operable to use vehicle-to-anything (V2X) wireless communication, as well as knowledge about the accuracy of sensors across different vehicle makes and models, to accurately identify the content of a road sign (e.g., what type of road sign is it, what rule is described by the road sign, etc.). The road sign system generates digital data that describes the content of the road sign. The road sign system provides the digital data to an ADAS system of the connected vehicle and, in this way, improves the performance of the ADAS system which can then make improved operating decisions for the connected vehicle based on the content of the road sign. These operating decisions are improved relative to the operating decisions made by the ADAS system without the benefit of the digital data provided by road sign system because the road sign is accurately described by this digital data.

Determining a content of a road sign includes, for example, determining a driving rule which is indicated by the road sign. For example, the road sign indicates the speed limit, and determining the content of the road sign includes determining the speed limit described by the road sign. In another example, the road sign is a stop sign, and determining the content of the road sign includes determining the speed limit described by the road sign and whether the road sign is a one-way stop sign, two-way stop sign, a three-way stop sign, or a four-way stop sign.

In some embodiments, the road sign system includes software installed in an onboard vehicle computer system of a connected vehicle (herein, an "ego vehicle"). Other connected vehicles on the roadway include their own instance of the road sign system installed in one of their own onboard vehicle computer systems. The ego vehicle's onboard sensors collect images of the roadway environment. A memory of the ego vehicle stores two data structures: (1) an image recognition database for road signs (e.g., object priors, or any other image recognition method); and (2) a vehicle model database that describes the quality of different sensors in different vehicles and how the orientation caused by their mounting affects their sensor measurements. The road sign system compares the images of the roadway environment to the image recognition database to: identify the presence of road signs; and determine an estimate of the information being communicated by the road sign (herein, "content data"). Nearby vehicles, including the ego vehicle, then communicate with each other via V2X communication and share the following information with one another: (1) their vehicle identifier (vehicle ID); (2) the number of road signs they have identified within some time interval; and (3) the content data for each of the road signs.

In some embodiments, the road sign system of the ego vehicle uses the vehicle ID to assign a weight to the different content data reported by other nearby vehicles. For each individual roadway sign, the road sign system of the ego vehicle compares the content data reported by other vehicles to the content data determined locally for these same signs. Based on this comparison, as well as the weighting applied based on the vehicle ID, the road sign system of the ego vehicle determines the content of each road sign. For example, the road sign system determines that a particular road sign indicates that the speed limit is 60 miles per hour (mph).

In some embodiments, the road sign system then reports the content on an electronic display of the vehicle (e.g., the dash meter display, a heads-up display unit, the head unit, etc.).

In some embodiments, the road sign system of the ego vehicle provides digital data to an ADAS system of the ego vehicle that describes the content of one or more road signs so that the ADAS system can make improved operating decisions for the ego vehicle.

In some embodiments, an example benefit of the road sign system includes identifying when there is a cluster of vehicles having the same make and model based on their vehicle IDs, and then providing greater weight to the content data reported by vehicles that have a different make and model than the cluster.

The road sign system works for autonomous vehicles as well as traditional non-autonomous vehicles.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including determining that a first set of first vehicles have assessed by that a content for a road sign is a first value. The method also includes determining that the content for the road sign is a second value assessed by a second set of second vehicles based, at least in part, on the first vehicles having a same make and model. Other embodiments of this aspect include corresponding computer systems, apparatus, and computer programs recorded on one or more computer storage devices, each configured to perform the actions of the methods.

Implementations may include one or more of the following features. The method where the first set is larger in number than the second set so that a majority of a group that includes the first vehicles and the second vehicles have assessed that the content for the road sign is the first value. The method where the method is executed by an onboard vehicle computer system of an ego vehicle. The method where the ego vehicle is included in the first set. The method where the ego vehicle included in the second set. The method where the ego vehicle receives a V2X message transmitted by a remote vehicle that includes content data that describes the content of the road sign as determined by the remote vehicle. The method further including determining that the content for the road sign is the second value based at least in part on the content data included in the V2X message. The method where the V2X message is a Dedicated Short-Range Communication (DSRC) message and a payload of the DSRC message is compliant with the DSRC standard. The method where the DSRC message is not one of the following: a WiFi message; a 3G message; a 4G message; a Long-Term Evolution (LTE) message; a millimeter wave communication message; and a satellite communication. Implementations of the described techniques may include hardware, a method or process, or computer software on a computer-accessible medium.

One general aspect includes a system including: a processor communicatively coupled to a non-transitory memory that stores computer code that is operable, when executed by the processor, to cause the processor to: determine that a first set of first vehicles have assessed by that a content for a road sign is a first value; and determine that the content for the road sign is a second value assessed by a second set of second vehicles based, at least in part, on the first vehicles having a same make and model. Other embodiments of this aspect include corresponding computer systems, apparatus, and computer programs recorded on one or more computer storage devices, each configured to perform the actions of the methods.

Implementations may include one or more of the following features. The system where the first set is larger in number than the second set so that a majority of a group that includes the first vehicles and the second vehicles have assessed that the content for the road sign is the first value. The system where the system an onboard vehicle computer system of an ego vehicle. The system where the ego vehicle is included in the first set. The system where the ego vehicle included in the second set. The system further including a V2X radio communicatively coupled to the processor, where the V2X radio is operable to receive a V2X message transmitted by a remote vehicle that includes content data that describes the content of the road sign as determined by the remote vehicle. The system where the non-transitory memory stores additional computer code that is operable, when executed by the processor, to cause the processor to determine that the content for the road sign is the second value based at least in part on the content data included in the V2X message. Implementations of the described techniques may include hardware, a method or process, or computer software on a computer-accessible medium.

One general aspect includes a computer program product including instructions that, when executed by one or more processors, cause the one or more processors to perform operations including: determining that a first set of first vehicles have assessed by that a content for a road sign is a first value; and determining that the content for the road sign is a second value assessed by a second set of second vehicles based, at least in part, on the first vehicles having a same make and model. Other embodiments of this aspect include corresponding computer systems, apparatus, and computer programs recorded on one or more computer storage devices, each configured to perform the actions of the methods.

Implementations may include one or more of the following features. The computer program product where the first set is larger in number than the second set so that a majority of a group that includes the first vehicles and the second vehicles have assessed that the content for the road sign is the first value. The computer program product where the computer program product is an element of an ego vehicle that includes an advanced driver assistance system (ADAS system) and the ADAS system of the ego vehicle uses the determination of the content of the road sign to control an ADAS function of the ego vehicle. The computer program product where the computer program product is an element of an autonomous vehicle and an onboard system of the autonomous vehicle uses the determination of the content of the road sign to autonomously control an operation of the autonomous vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 5 and 6 are block diagrams illustrating an example of Basic Safety Message (BSM) data according to some embodiments.

DETAILED DESCRIPTION

Figure 1:
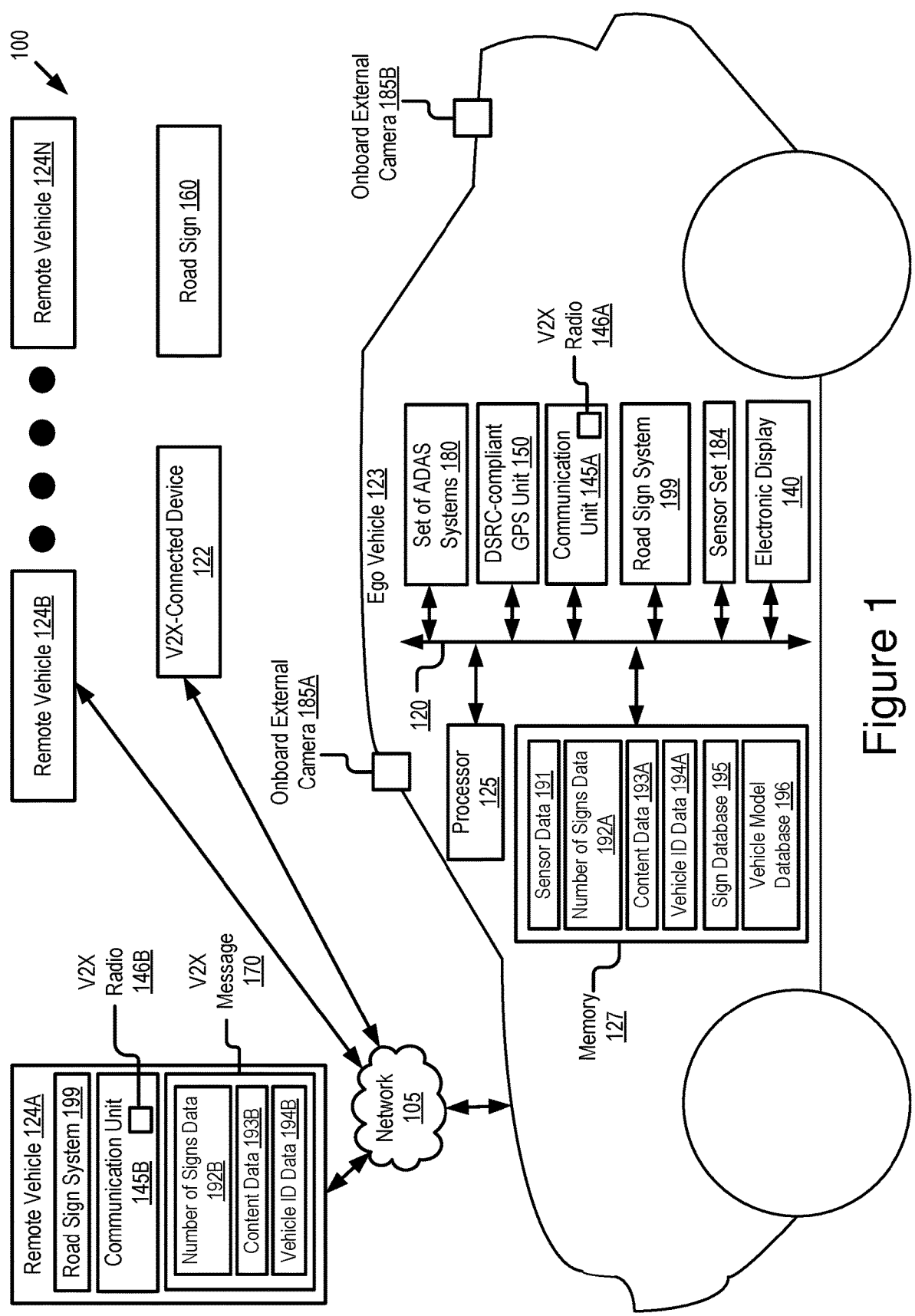
FIG. 1 is a block diagram illustrating an operating environment for a road sign system according to some embodiments.

Embodiments of a road sign system that is operable to identify the content of a road sign using V2X communications are described. Examples of V2X communication include one or more of the following types of wireless communication: DSRC; LTE; millimeter wave communication; 3G; 4G; 5G LTE-Vehicle-to-Anything (LTE-V2X); LTE-Vehicle-to-Vehicle (LTE-V2V); LTE-Device-to-Device (LTE-D2D); LTE-5G; Voice over LTE (VoLTE); and any derivative or fork of one or more of the V2X communication protocols listed here.

Image recognition is frequently inaccurate. This is potentially a fatal problem when image recognition is used for vehicular applications. For example, if image recognition is used to determine the content of a roadway sign, then an ADAS system of a vehicle may make a fatal operating decision for the vehicle based on the inaccurate image recognition result.

Described herein are embodiments of a road sign system that is installed in an onboard vehicle computer system of a connected vehicle. The road sign system is operable to use V2X communication, as well as knowledge about the accuracy of sensors across different vehicle makes and models, to accurately identify the content of a road sign (e.g., what type of road sign is it, what rule is described by the road sign, etc.). The road sign system generates digital data that describes the content of the road sign. The road sign system provides the digital data to an ADAS system of the connected vehicle and, in this way, improves the performance of the ADAS system which can then make improved operating decisions for the connected vehicle based on the content of the road sign. These operating decisions are improved relative to the operating decisions made by the ADAS system without the benefit of the digital data provided by road sign system because the road sign is accurately described by this digital data.

Frequently, this disclosure explains the functionality of the road sign system by reference to speed limit signs.

However, road sign system works with all types of roadway signs and is not limited to speed limit signs.

In some embodiments, the road sign system works with both vehicle-to-vehicle (V2V) communication (e.g., the ego vehicle communicates with other remote vehicles) and vehicle-to-infrastructure communication (e.g., the ego vehicle communicates with V2X-connected devices such as roadside units (RSUs) and other infrastructure devices that are operable to relay V2X communications).

In some embodiments, a road sign system includes software installed in an onboard vehicle computer of a connected vehicle (herein, an "ego vehicle"). An onboard vehicle computer includes, for example, an onboard unit, electronic control unit (ECU), head unit or some other processor-based computing device of a vehicle. Other connected vehicles on a roadway at the same time as the ego vehicle are referred to as "remote vehicles." Some or all of these remote vehicles include a road sign assistant.

In some embodiments, a non-transitory memory of the ego vehicle stores two data structures: (1) an image recognition database for road signs (e.g., object priors, or any other image recognition method); and (2) a vehicle model database that describes the quality of different sensors in different vehicles and how the orientation caused by their mounting affects their sensor measurements. The onboard sensors of the ego vehicle generate sensor data 191 that describes, among other things, images of the roadway environment. The road sign system compares the images of the roadway environment to the image recognition database to: identify the presence of road signs; and determine an estimate of the information being communicated by the road sign (herein, "content data"). Nearby vehicles, including the ego vehicle and the remote vehicles, then communicate with each other via V2X communication and share digital data describing the following information: (1) their vehicle ID; (2) the number of road signs they have identified within some time interval; and (3) the content data for each of the road signs. The digital data is included in V2X messages which are transmitted among the ego vehicle and one or more remote vehicles. In this way, the road sign system of the ego vehicle uses V2X communications with one or more remote vehicles to obtain digital data that can be used to improve the image recognition results of the onboard systems of the ego vehicle (e.g., of an ADAS system of the ego vehicle).

In some embodiments, a vehicle ID is received for each remote vehicle that transmits a V2X message to the ego vehicle. The road sign system of the ego vehicle uses the vehicle ID to assign a weight to the different content data reported by other nearby vehicles. For example, the vehicle model database of the ego vehicle includes a table having a list of vehicle IDs in one column and a list of weights in a neighboring column that are associated with each vehicle ID. The road sign system queries the vehicle model database using the vehicle ID and receives a response from the vehicle model database that includes the weight to be assigned to the content data received from the particular remote vehicle having this particular vehicle ID. The vehicle ID and the weight are now described according to some embodiments.

In some embodiments, the vehicle ID is digital data that describes an indication of the make and model of the remote vehicle that transmitted a particular V2X message. Note that the vehicle ID is an indication of the make and model of a vehicle, and not a unique identifier such as a vehicle identifier number (VIN number), so many different vehicles on the roadway may have the same vehicle ID at any given time. This is particularly true of popular vehicles such as the Toyota Camry, Toyota Corolla, etc., where it would be normal to have a cluster of the same make and model on the roadway at the same time and traveling near each other.

In some embodiments, the weight is digital data that describes an indication of (1) the quality of the sensors installed in a particular make and model of vehicle [which is indicated by the vehicle ID]; (2) whether the sensors of a particular make and model of vehicle are more optimally mounted for sign recognition; and (3) other attributes that affect the reliability of an image recognition estimate generated based on images captured by these sensors. In some embodiments, the weight for a particular vehicle ID is reduced by the road sign system if the ego vehicle receives a large number of instances of content data having the same vehicle ID during any given period of time. In some embodiments, the road sign system stores digital data that describes a threshold which, if satisfied, indicates that a large number of instances of content data having the same vehicle ID during a given period of time have been received by the ego vehicle. In some embodiments, the road sign system stores digital data that an amount of time that defines the period of time.

In some embodiments, for each individual roadway sign, the road sign system compares the content data reported by one or more remote vehicles to the content data determined locally for these same signs by the ego vehicle. Based on this comparison, as well as the weighting applied based on the vehicle ID, the road sign system of the ego vehicle determines the content of each road sign. For example, the road sign system determines that a particular road sign indicates the speed limit is 60 miles per hour (mph); this is repeated for each road sign whose presence is detected by the road sign system. The road sign system then reports the content on an electronic display of the ego vehicle (e.g., the dash meter display of the ego vehicle, a heads-up display unit of the ego vehicle, the head unit of the ego vehicle, or any other electronic display of the ego vehicle.). In some embodiments, the road sign system provides digital data to an onboard system of the ego vehicle (e.g., an ADAS system) that describes the content of one or more road signs as determined by the road sign system.

In some embodiments, a novel aspect of the road sign system includes identifying when there is a cluster of vehicles having the same make and model based on their vehicle IDs, and then providing greater weight to the content data reported by vehicles that have a different make and model than the cluster. For example, vehicles having the same make and model generally have the same sensors and sensor mounting configurations, meaning that they will render the same image recognition results (which may be incorrect). Our research shows that in these situations better image recognition results are obtained by the road sign system by assigning a lower weight to content data reported by a cluster of vehicles having the same make and model. This is because the cluster skews the outcome of the image recognition result to the direction of the cluster (even when this is the wrong outcome), whereas giving the cluster a lower weight decreases this risk of bias. In other words, the mere fact that a particular make and model of vehicle is popular does not mean that it provides good image recognition results. However, operating by a majority rule (i.e., that the image recognition result of the majority of the vehicles) would lead to outcomes that are ultimately based on this false assumption. The road sign system beneficially removes this bias by assigning a lower weight to observed real-time instances of clusters of vehicles having the same make and model.

In some embodiments, an example point of novelty is identifying that one or more remote vehicles have the same make and model as the ego vehicle, and providing less weight to these remote vehicles' image recognition results because they will likely generate the same recognition result as the ego vehicle, and so, there content data does not help as much to improve the accuracy of the image recognition results of the ego vehicle (although there confirmation does provide some greater confidence in the result of the ego, and so, the weight assigned to them is not zero).

In some embodiments, an example point of novelty is the ability to display the image recognition result in a three-dimensional heads-up display device (3D-HUD) or augmented reality (AR) viewing device. An example of a suitable 3D-HUD and AR viewing device is described in U.S. patent application Ser. No. 15/603,086 filed on May 23, 2017 and entitled "Providing Traffic Mirror Content to a Driver," the entirety of which is hereby incorporated by reference. Another example of a suitable 3D-HUD and AR viewing device is described in U.S. patent application Ser. No. 15/591,100 filed on May 9, 2017 and entitled "Augmented Reality for Vehicle Lane Guidance," the entirety of which is hereby incorporated by reference.

In some embodiments, the road sign system is an element of an autonomous vehicle. In some embodiments, the road sign system is an element of a non-autonomous vehicle.

In some embodiments, the vehicles that include the road sign system are DSRC-equipped vehicles. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages. A DSRC-compliant GPS unit is operable to provide positional information for a vehicle (or some other DSRC-equipped device that includes the DSRC-compliant GPS unit) that has lane-level accuracy. The DSRC-compliant GPS unit is described in more detail below A "DSRC-equipped" device is a processor-based device that includes a DSRC radio, a DSRC-compliant GPS unit and is operable to lawfully send and receive DSRC messages in a jurisdiction where the DSRC-equipped device is located. Various endpoints may be DSRC-equipped devices, including, for example, a roadside unit (RSU), a smartphone, a tablet computer and any other processor-based computing device that includes a DSRC radio and is operable to lawfully send and receive DSRC messages as described above.

In some embodiments, an RSU that is a DSRC-equipped device does not include a DSRC-compliant GPS unit, but does include a non-transitory memory that stores digital data describing positional information for the RSU having lane-level accuracy, and the DSRC radio or some other system of the RSU inserts a copy of this digital data in the BSM data that is transmitted by the DSRC radio of the RSU. In this way, the RSU does not include a DSRC-compliant GPS unit but is still operable to distribute BSM data that satisfies the requirements for the DSRC standard. The BSM data is described in more detail below with reference to FIGS. 4 and 5 according to some embodiments.

A DSRC message is a wireless message that is specially configured to be sent and received by highly mobile devices such as vehicles, and is compliant with one or more of the following DSRC standards, including any derivative or fork thereof:EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States, Europe and Asia, DSRC messages are transmitted at 5.9 GHz. In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

The wireless messages of key fobs made as a component of a remote keyless entry system are not DSRC messages for additional reasons. For example, the payload for a DSRC message is also required to include digital data describing a rich amount of vehicular data of various types of data. In general, a DSRC message always includes, at a minimum, a unique identifier of the vehicle which transmits the DSRC message as well as the GPS data for that vehicle. This amount of data requires a larger bandwidth than what is possible for other types of non-DSRC wireless messages. The wireless messages of key fobs as a component of a remote keyless entry system are not DSRC messages because they do not include a payload which is permissible under the DSRC standard. For example, a key fob merely transmits a wireless message including a digital key which is known to a vehicle which is paired with the key fob; there is not sufficient bandwidth for other data to be included in the payload because the bandwidth allocated for these transmissions is very small. By comparison, DSRC messages are allocated large amounts of bandwidth and are required to include a far richer amount of data, including, for example, a unique identifier and the GPS data for the vehicle which transmitted the DSRC message.

In some embodiments, a DSRC-equipped vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway.

In some embodiments, a DSRC-compliant GPS unit is operable to identify, monitor and track its two-dimensional position within 1.5 meters of its actual position 68% of the time under an open sky.

Referring to FIG. 1, depicted is an operating environment 100 for a road sign system 199 according to some embodiments. As depicted, the operating environment 100 includes the following elements: an ego vehicle 123; a first remote vehicle 124A, a second remote vehicle 124B ... and an Nth remote vehicle 124N (the first remote vehicle 124A, the second remote vehicle 124B ... and the Nth remote vehicle 124N are referred to herein collectively or individually as the "remote vehicle 124" or the "remote vehicles 124"); and a V2X connected device 122. These elements are communicatively coupled to one another by a network 105. The operating environment 100 also includes a road sign 160. The "N" used for the remote vehicle 124N in FIG. 1, as well as the ellipsis that separates the second remote vehicle 124B from the Nth remote vehicle 124N in FIG. 1, indicates that the operating environment 100 may include any positive whole number of remote vehicles 124.

Although one V2X-connected device 122, one road sign 160 and one network 105 are depicted in FIG. 1, in practice the operating environment 100 may include one or more V2X-connected devices 122, one or more road signs 160 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, LTE, LTE-V2V, LTE-V2I, LTE-V2X, LTE-D2D, LTE-5G, VoLTE or any other mobile data network or combination of mobile data networks. Further, the network 105 may include one or more IEEE 802.11 wireless networks.

The following are endpoints of the network 105: the ego vehicle 123; the remote vehicles 124; and the V2X-connected device 122. In some embodiments, the ego vehicle 123 and one or more of the remote vehicles 124 include an instance of the road sign system 199. These road sign systems 199 cooperate with one another via the network 105 to provide the road sign detection service of the road sign system to the ego vehicle 123 and the remote vehicles 124 that include an instance of the road sign system 199, and thereby decrease the likelihood that the content of road signs is inaccurately identified by one or more of the ego vehicle 123 and the remote vehicles 124 that include their own instance of the road sign system 199.

The ego vehicle 123 is any type of connected vehicle. For example, the ego vehicle 123 is one of the following types of vehicles that include a communication unit 145A: a car; a truck; a sports utility vehicle; a bus; a semi-truck; a robotic car; a drone or any other roadway-based conveyance. In some embodiments, the ego vehicle 123 is a DSRC-equipped vehicle.

In some embodiments, the ego vehicle 123 is an autonomous vehicle or a semi-autonomous vehicle. For example, the ego vehicle 123 includes a set of Advanced Driver Assistance Systems 180 (a set of ADAS systems 180) which provide autonomous features to the ego vehicle 123 which are sufficient to render the ego vehicle 123 an autonomous vehicle. The set of ADAS systems 180 includes one or more ADAS systems.

The National Highway Traffic Safety Administration ("NHTSA") has defined different "levels" of autonomous vehicles, e.g., Level 0, Level 1, Level 2, Level 3, Level 4 and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower level number. The different levels of autonomous vehicles are described briefly below.

Level 0: The set of ADAS systems 180 installed in a vehicle have no vehicle control. The set of ADAS systems 180 may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems 180 installed in the autonomous vehicle may provide autonomous features such as one or more of the following: Adaptive Cruise Control (ACC); and Parking Assistance with automated steering and Lane Keeping Assistance (LKA) Type II, in any combination.

Level 2: The driver is obliged to detect objects and events in the roadway environment and respond if the set of ADAS systems 180 installed in the autonomous vehicle fail to respond properly (based on the driver's subjective judgement). The set of ADAS systems 180 installed in the autonomous vehicle executes accelerating, braking, and steering. The set of ADAS systems 180 installed in the autonomous vehicle can deactivate immediately upon takeover by the driver.

Level 3: Within known, limited environments (such as freeways), the driver can safely turn their attention away from driving tasks but must still be prepared to take control of the autonomous vehicle when needed.

Level 4: The set of ADAS systems 180 installed in the autonomous vehicle can control the autonomous vehicle in all but a few environments such as severe weather. The driver must enable the automated system (which is comprised of the set of ADAS systems 180 installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle (HAV) is an autonomous vehicle that is Level 3 or higher.

Accordingly, in some embodiments the ego vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The set of ADAS systems 180 includes one or more of the following ADAS systems: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system (also referred to as a LKA system); a pedestrian protection system; a traffic sign recognition system; a turning assistant; a wrong-way driving warning system; autopilot; sign recognition; and sign assist. Each of these example ADAS systems provide their own features and functionality that may be referred to herein as an "ADAS feature" or an "ADAS functionality," respectively. The features and functionality provided by these example ADAS systems are also referred to herein as an "autonomous feature" or an "autonomous functionality," respectively.

In some embodiments, the ego vehicle 123 includes the following elements: the set of ADAS systems 180; a processor 125; a memory 127; a communication unit 145A; a DSRC-compliant GPS unit 150; a first onboard external camera 185A and a second onboard external camera 185B (which are referred to collectively or individually as the "onboard external camera 185"); a sensor set 184; an electronic display 140; and a road sign system 199. These elements of the ego vehicle 123 are communicatively coupled to one another via a bus 120. Although the ego vehicle 123 is depicted as including two onboard external cameras 185, in practice the ego vehicle 123 may include one or more onboard external cameras 185, or optionally no onboard external cameras 185. The onboard external cameras 185 are not depicted in FIG. 1 as being communicatively coupled to the bus 120, but in practice the onboard external cameras 185 are communicatively coupled to the bus 120.

The set of ADAS systems 180 was described above, and so, that description will not be repeated here.

In some embodiments, the processor 125 and the memory 127 may be elements of an onboard vehicle computer system (such as computer system 200 described below with reference to FIG. 2). The onboard vehicle computer system may be operable to cause or control the operation of the road sign system 199 of the ego vehicle 123. The onboard vehicle computer system may be operable to access and execute the data stored on the memory 127 to provide the functionality described herein for the road sign system 199 of the ego vehicle 123 or its elements (see, e.g., FIG. 2). The onboard vehicle computer system may be operable to execute the road sign system 199 which causes the onboard vehicle computer system to execute one or more steps of the method 300 described below with reference to FIG. 3.

In some embodiments, the processor 125 and the memory 127 may be elements of an onboard unit. The onboard unit includes an electronic control unit (herein "ECU") or an onboard vehicle computer system that may be operable to cause or control the operation of the road sign system 199. The onboard unit may be operable to access and execute the data stored on the memory 127 to provide the functionality described herein for the road sign system 199 or its elements. The onboard unit may be operable to execute the road sign system 199 which causes the onboard unit to execute one or more steps of the method 300 described below with reference to FIG. 3. In some embodiments, the computer system 200 depicted in FIG. 2 is an example of an onboard unit.

In some embodiments, the DSRC-compliant GPS unit 150 includes any hardware and software necessary to make the ego vehicle 123 or the DSRC-compliant GPS unit 150 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the DSRC-compliant GPS unit 150 is operable to provide GPS data describing the location of the ego vehicle 123 with lane-level accuracy. For example, the ego vehicle 123 is traveling in a lane of a roadway. Lane-level accuracy means that the location of the ego vehicle 123 is described by the GPS data so accurately that the ego vehicle's 123 lane of travel within the roadway may be accurately determined based on the GPS data for this ego vehicle 123 as provided by the DSRC-compliant GPS unit 150. In some embodiments, the GPS data is an element of the BSM data that is transmitted by the communication unit 145A as an element of a BSM.

In some embodiments, the DSRC-compliant GPS unit 150 includes hardware that wirelessly communicates with a GPS satellite to retrieve GPS data that describes the geographic location of the ego vehicle 123 with a precision that is compliant with the DSRC standard. The DSRC standard requires that GPS data be precise enough to infer if two vehicles (one of which is, for example, the ego vehicle 123) are located in adjacent lanes of travel. In some embodiments, the DSRC-compliant GPS unit 150 is operable to identify, monitor and track its two-dimensional position within 1.5 meters of its actual position 68% of the time under an open sky. Since driving lanes are typically no less than 3 meters wide, whenever the two-dimensional error of the GPS data is less than 1.5 meters the road sign system 199 described herein may analyze the GPS data provided by the DSRC-compliant GPS unit 150 and determine what lane the ego vehicle 123 is traveling in based on the relative positions of two or more different vehicles (one of which is, for example, the ego vehicle 123) traveling on the roadway at the same time.

By comparison to the DSRC-compliant GPS unit 150, a conventional GPS unit which is not compliant with the DSRC standard is unable to determine the location of an ego vehicle 123 with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to identify a lane of travel for an ego vehicle 123 based on GPS data alone; instead, systems having only conventional GPS units must utilize sensors such as cameras to identify the ego vehicle's 123 lane of travel. Identifying a lane of travel of a vehicle is beneficial, for example, because in some embodiments it may enable the road sign system 199 to more accurately identify whether a particular instance of content data 193B received from a remote vehicle 124 describes a same road sign 160 described by a particular instance of content data 193A as determined by the ego vehicle 123.

In some embodiments, the ego vehicle 123 may include a sensor set 184. The sensor set 184 includes one or more sensors that are operable to measure the physical environment outside of the ego vehicle 123. For example, the sensor set 184 may include one or more sensors that record one or more physical characteristics of the physical environment that is proximate to the ego vehicle 123. The memory 127 may store sensor data 191 that describes the one or more physical characteristics recorded by the sensor set 184. The sensor data 191 may be used by the road sign system 199 to determine the content of a road sign 160. The sensor data 191 is stored in the memory 127. The onboard external cameras 185 are an element of the sensor set 184. Although not depicted as such in FIG. 1, in some embodiments the onboard external cameras 185 are communicatively coupled to the bus 120 so that their sensor data 191 is stored in the memory 127.

In some embodiments, the sensor set 184 of the ego vehicle 123 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

In some embodiments, the sensor set 184 includes any sensors which are operable to detect the presence of road signs (e.g., the road sign 160) and perform image recognition to ascertain their content (e.g., what the words printed on the road sign say). For example, the sensor set 184 includes a set of cameras (e.g., the onboard external cameras 185) and range finders. The range finders may assist in correcting for skews in the orientation of the road sign 160 as this skew can be determined if the distance from the ego vehicle 123 to the road sign 160 is determined along several points of the road sign (e.g., two is an acceptable number of points, but more points is better). Accelerometers may also be included in the sensor set 184 as a means of determining the forward or backward pitch of the cameras, as well as the left-to-right yaw of the cameras, as this information improves the image recognition process by correcting for image deficiencies or pixel exaggerations.

The onboard external cameras 185 are onboard cameras of the ego vehicle 123. In some embodiments, the onboard external cameras 185 are high definition cameras. In some embodiments, the onboard external cameras 185 include servo motors that are operable to reconfigure the viewing angle of the onboard external cameras. For example, the onboard external cameras 185 are operable to pan up, pan down or pan side-to-side in order to capture particular images in particular places.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The memory 127 is a non-transitory memory that stores instructions or data that may be accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The ego vehicle 123 may include one or more memories 127.

The memory 127 of the vehicle 123 stores one or more of the following types of digital data: the sensor data 191; number of signs data 192A; content data 193A; vehicle ID data 194A; a sign database 195; and a vehicle model database 196.

Although not depicted in FIG. 1, in some embodiments the memory 127 stores one or more V2X messages 170 which are received from one or more remote vehicles 124 via the network 105.

In some embodiments the memory 127 stores the BSM data 197 depicted in FIGS. 5 and 6. For example, in some embodiments the V2X message 170 is a BSM and the number of signs data 192B, content data 193B and the vehicle ID data 194B are elements of the BSM data 197 that is included as the payload for the BSM which is transmitted by the remote vehicle 124 and received by the ego vehicle 123.

In some embodiments, the memory 127 stores DSRC data which is digital data received in a DSRC message or transmitted as a DSRC message. The DSRC data describes any information that is included in the BSM data 197. For example, a BSM message is a special type of DSRC message which is transmitted at a regular interval (e.g., once every 0.10 seconds), but the content or payload of a DSRC message (i.e., the DSRC data) is the same as that of a BSM message (i.e., the DSRC data for a DSRC message is the same as or similar to the BSM data for a BSM message).

In some embodiments, the memory 127 stores, as digital data, any data described herein. In some embodiments, the memory 127 stores any data that is necessary for the road sign system 199 to provide its functionality.

The sensor data 191 is digital data that describes the recordings and images captured by the sensor set 184. The sensor data 191 includes images of the roadway environment. For example, the sensor data 191 includes images of the road sign 160.

The number of signs data 192A is digital data that describes the number of road signs that the road sign system 199 of the ego vehicle 123 has identified in the images collected by the sensor set 184 of the ego vehicle 123 within the last time period.

The content data 193A is digital data describing, for each road sign included in the number of signs data 192A, an estimate of what the characters (e.g., words, symbols, numbers, etc.) that are included in the content of the road sign. For example, if the road sign 160 is a "STOP sign," then the content data 193A describes the letters "S," "T," "O" and "P."

The vehicle ID data 194A is digital data that describes the make and model of the ego vehicle 123 which collected the sensor data 191 which was used to generate the number of signs data 192A and the content data 193A.

In some embodiments, the road sign system 199 of the ego vehicle 123 includes code and routines that are operable, when executed by the processor 125 of the ego vehicle 123, to analyze the sensor data 191 and the sign database 195 to generate the number of signs data 192A and the content data 193A based on the sensor data 191 and the sign database 195.

The sign database 195 is a data structure that stores and organizes digital data that describes object priors of road signs and any other digital data that is used for image recognition which is performed by comparison of the images included in the sensor data 191 to the sign database 195 in order to identify images of road signs and determine their content. In this way, the road sign system 199 analyzes the sensor data 191 and the sign database 195 to identify a number of signs included in the images of the sensor data 191 (e.g., the number of signs data 192A) and the content of the road signs included in these images (e.g., the content data 193A).

The vehicle model database 196 is digital data that describes a table (or some other data structure) that includes a list of vehicle IDs in one column and a list of weights in a neighboring column that are associated with each vehicle ID. In some embodiments, the a list of weights are applied by the road sign system 199 to image recognition results based on one or more of the following: the make and model of the vehicle that collected the sensor data 191 that was used to generate the image recognition results; and how this make and model corresponds to (1) the quality of the sensors used in that make and model and (2) the orientation of how these sensors are mounted, and how this orientation relates to images which are optimized for accurate image recognition results. As used herein, the term "image recognition results" refers to one or more of the following: the content data 193B included in a V2X message 170 received by the ego vehicle 123 and transmitted by a remote vehicle 124; and the content data 193A as determined by the road sign system 199 of the ego vehicle 123 or an ADAS system of the ego vehicle 123. Existing solutions do not include a data structure such as the vehicle model database 196.

The communication unit 145 transmits and receives data to and from a network 105 or to another communication channel. In some embodiments, the communication unit 145 may include a DSRC transceiver, a DSRC receiver and other hardware or software necessary to make the ego vehicle 123 is a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio 146A. The V2X radio 146A is a hardware unit that includes a transmitter and a receiver that is operable to send and receive wireless messages via any V2X protocol. For example, the V2X radio 146A includes any hardware and software that is necessary to send and receive one or more of the following types of V2X message: DSRC; LTE; millimeter wave communication; 3G; 4G; 5G LTE-V2X; LTE-V2V; LTE-D2D; LTE-5G; VoLTE; and any derivative or fork of one or more of the V2X communication protocols listed here. In some embodiments, the V2X radio 146A is a multi-channel V2X radio that includes a plurality of channels. In some embodiments, some of the channels are operable to send and receive V2X messages via a first V2X protocol whereas some of the channels are operable to send and receive V2X messages via an Nth V2X protocol.

In some embodiments, the V2X radio 146A is a DSRC radio. For example, the V2X radio 146A is operable to send and receive wireless messages via DSRC. The V2X transmitter is operable to transmit and broadcast DSRC messages over the 5.9 GHz band. The V2X receiver is operable to receive DSRC messages over the 5.9 GHz band. The V2X radio includes seven channels (e.g., DSRC channel numbers 172, 174, 176, 178, 180, 182 and 184) with at least one of these channels reserved for sending and receiving BSMs (e.g., DSRC channel number 172 is reserved for BSMs). In some embodiments, at least one of these channels is reserved for sending and receiving Pedestrian Safety Messages ("PSM" if singular, or "PSMs" if plural) as described in U.S. patent application Ser. No. 15/796,296 filed on Oct. 27, 2017 and entitled "PSM Message-based Device Discovery for a Vehicular Mesh Network," the entirety of which is hereby incorporated by reference. In some embodiments, DSRC channel number 172 is reserved for sending and receiving PSMs.

In some embodiments, the V2X radio 146A includes a non-transitory memory which stores digital data that controls the frequency for broadcasting BSM messages. In some embodiments, the non-transitory memory stores a buffered version of the GPS data for the ego vehicle 123 so that the GPS data for the ego vehicle 123 is broadcast as an element of the BSMs which are regularly broadcast by the V2X radio 146A. BSMs may be broadcast by the V2X radio 146A over various V2X protocols, and not just DSRC.

In some embodiments, the V2X radio 146A includes any hardware or software which is necessary to make the ego vehicle 123 compliant with the DSRC standards. In some embodiments, the DSRC-compliant GPS unit 150 is an element of the V2X radio 146A.

The electronic display 140 includes any type of electronic display device including, for example, one or more of the following: a dash meter display of the ego vehicle 123; a heads-up display unit of the ego vehicle 123; an AR display of the ego vehicle 123; and a head unit of the ego vehicle 123.

Figure 3:
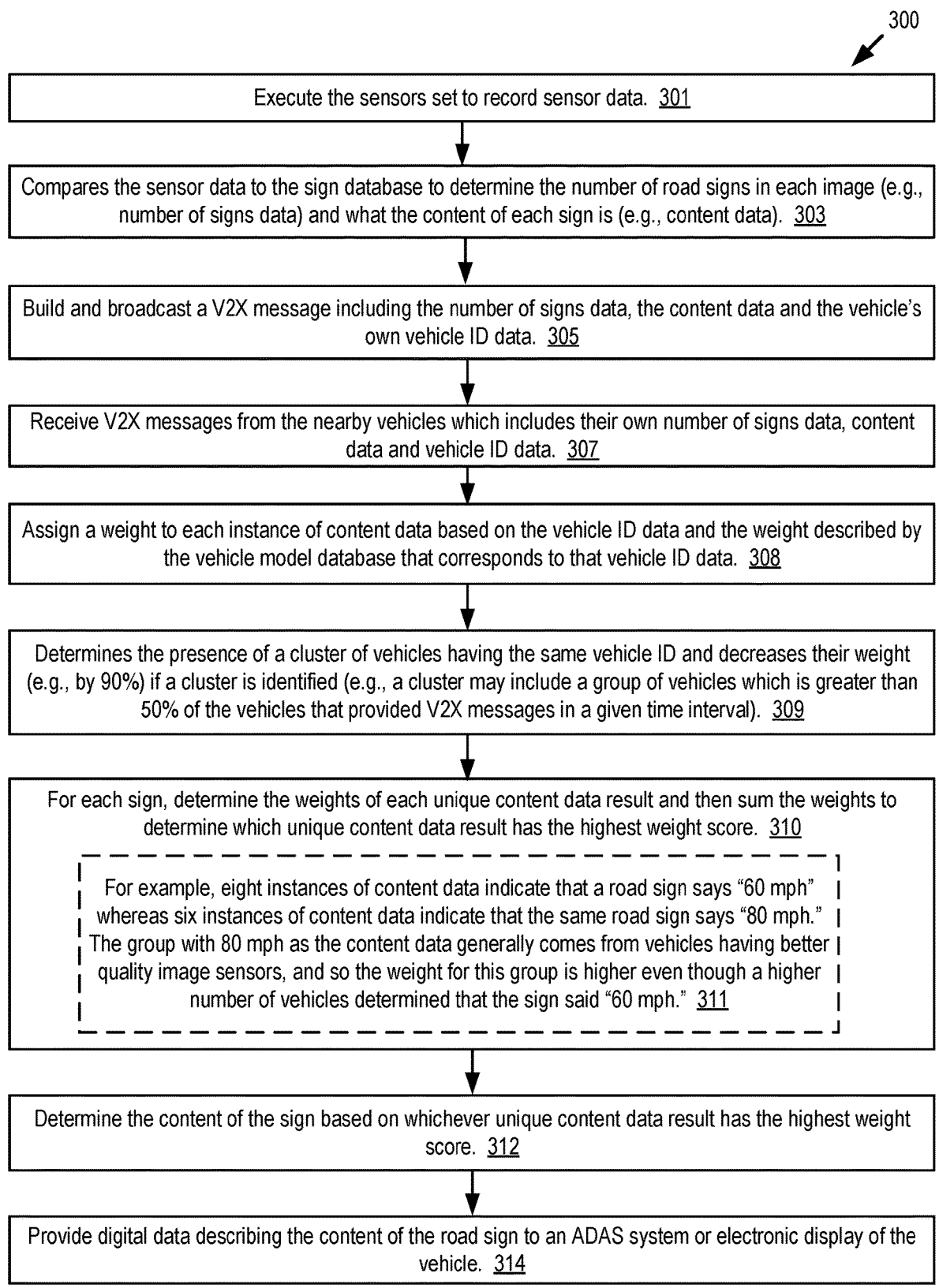
FIG. 3 depicts a method for determining the content of a road sign according to some embodiments.

In some embodiments, the road sign system 199 includes software that is operable, when executed by the processor 125, to cause the processor 125 to execute one or more the steps of the method 300 depicted in FIG. 3.

Figure 4:
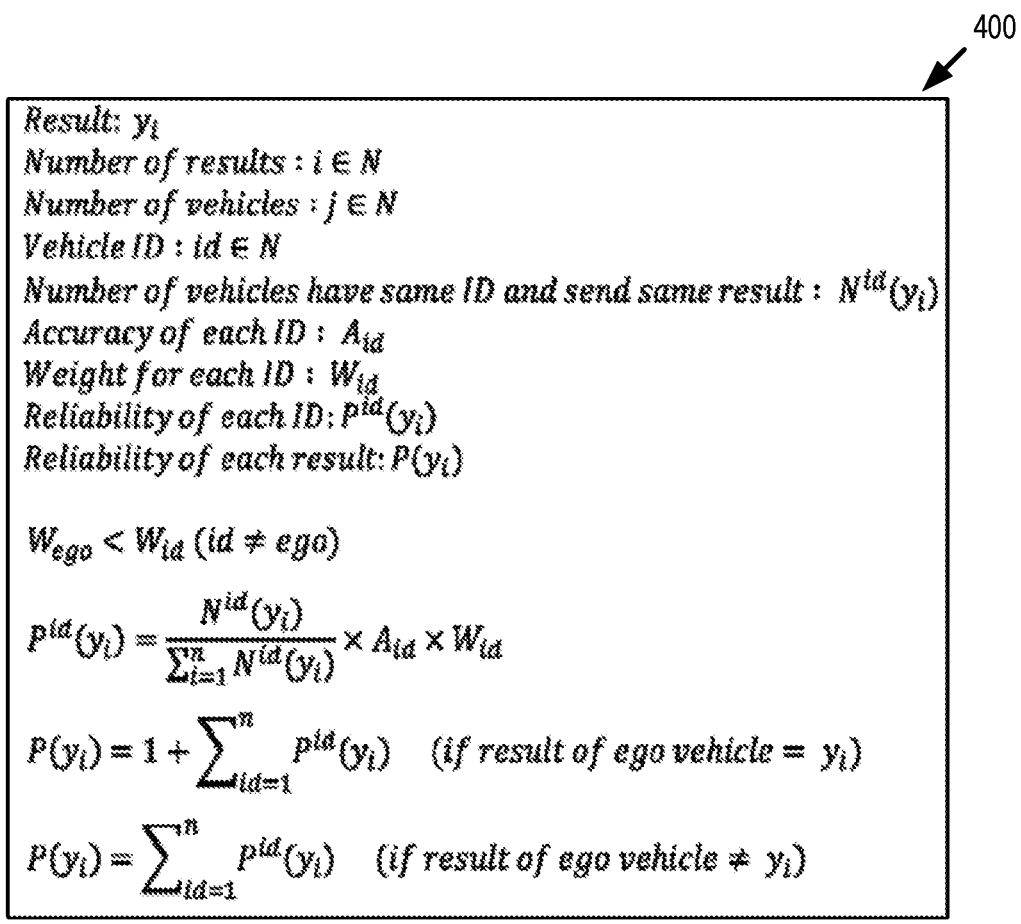
FIG. 4 is a block diagram illustrating an example analysis provided by the road sign system according to some embodiments.

In some embodiments, the road sign system 199 includes software that is operable, when executed by the processor 125, to cause the processor 125 to execute the analysis 400 depicted in FIG. 4.

In some embodiments, the road sign system 199 is implemented using hardware including a field-programmable gate array ("FPGA") or an application-specific integrated circuit ("ASIC"). In some other embodiments, the road sign system 199 is implemented using a combination of hardware and software.

The road sign system 199 is described in more detail below with reference to FIGS. 2-6.

The remote vehicles 124 include elements similar to the ego vehicle 123, and so, those descriptions will not be repeated here. For example, the remote vehicle 124 includes one or more of the following elements: a road sign system 199; a communication unit 145B including a V2X radio 146B; and a V2X message. The road sign system 199 of the remote vehicle 124 provides the same functionality as the road sign system 199 of the ego vehicle 123, and so that description will not be repeated here. The communication unit 145B and the V2X radio 146B of the remote vehicle 124 provide the same functionality as the communication unit 145A and the V2X radio 146A of the ego vehicle 123, and so, those descriptions will not be repeated here.

Although not depicted in FIG. 1, in some embodiments the remote vehicle 124 includes one or more of the elements of the ego vehicle 123. For example, the remote vehicle 124 includes one or more of the following: a sensor set 184; a processor 125; a memory 127 storing sensor data 191 recorded by the sensor set 184, the V2X message 170 and the digital data included in the V2X message, a sign database 195 and a vehicle model database 196; a set of ADAS systems 180; a DSRC-compliant GPS unit 150; and an electronic display 140.

The road sign system 199 of the remote vehicle 124 provides the same functionality to the remote vehicle 124 as the road sign system 199 of the ego vehicle 123 provides to the ego vehicle 123. For example, the road sign system 199 of the remote vehicle 124 generates the number of signs data 192B and the content data 193B in a manner similar to how the road sign system 199 of the ego vehicle 123 generates the number of signs data 192A and the content data 193A using the sensor data 191, sign database 195 and vehicle model database 196 of the ego vehicle 123.

The road sign system 199 of the remote vehicle 124 builds a V2X message 170 and causes the communication unit 145B to transmit the V2X message 170 to the ego vehicle 123 via the network 105. In some embodiments, the communication unit 145B broadcasts the V2X message 170. The V2X message 170 includes the following types of digital data: number of signs data 192B; content data 193B; and vehicle ID data 194B.

The number of signs data 192B is digital data that describes the number of road signs that the road sign system 199 of the remote vehicle 124 has identified in the images collected by the sensor set (not pictured) of the remote vehicle 124 within the last time period.

The content data 193B is digital data describing, for each road sign included in the number of signs data 192B, an estimate of what the characters (e.g., words, symbols, numbers, etc.) that are included in the content of the road sign.

The vehicle ID data 194B is digital data that describes the make and model of the remote vehicle 124 which collected the sensor data 191 which was used to generate the number of signs data 192A and the content data 193A.

In some embodiments, the road sign system 199 of the remote vehicle 124 includes code and routines that are operable, when executed by the processor (not pictured) of the remote vehicle 124, to analyze the sensor data (not pictured) of the remote vehicle 124 and the sign database (not pictured) of the remote vehicle 124 to generate the number of signs data 192B and the content data 193B based on the sensor data and the sign database of the remote vehicle 124.

The V2X-connected device 122 includes a smartphone, tablet computer, personal computer, roadside unit or some other processor-based computing device that includes a communication unit such as the communication unit 145A. In some embodiments, the V2X-connected device 122 is a DSRC-equipped device. The V2X-connected device 122 is operable, for example, to receive V2X messages 170 and relay these messages to other connected devices such as the ego vehicle 123 and the remote vehicle 124. In this way, the V2X-connected device 122 may relay a V2X message 170 to an ego vehicle 123 from the remote vehicle 124 that would otherwise be outside of transmission range of the remote vehicle 124.

The road sign 160 is a conventional road sign included in a roadway environment. For example, the road sign 160 is a stop sign, speed limit sign, yield sign, four-way stop sign or any other type of conventional road sign.

Example Computer System

Figure 2:
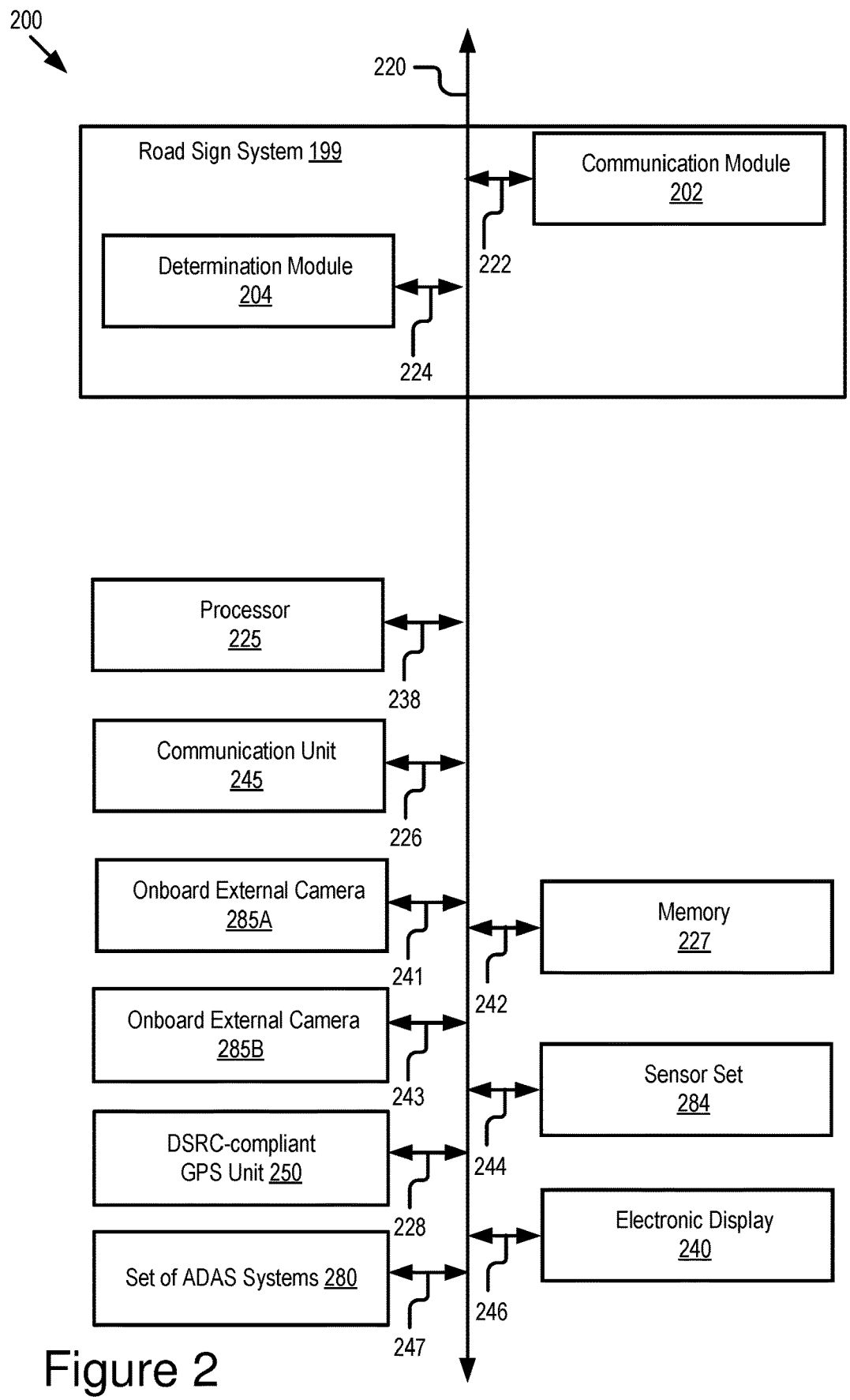
FIG. 2 is a block diagram illustrating an example computer system including the road sign system according to some embodiments.

Referring now to FIG. 2, depicted is a block diagram illustrating an example computer system 200 including the road sign system 199 according to some embodiments. In some embodiments, the computer system 200 may include a special-purpose computer system that is programmed to perform one or more steps of the method 300 described below with reference to FIG. 3 or the analysis 400 described below with reference to FIG. 4. In some embodiments, the computer system 200 is an onboard vehicle computer of a vehicle such as the ego vehicle 123 or the remote vehicle 124. In some embodiments, the computer system 200 is an onboard unit of the ego vehicle 123 or the remote vehicle 124. In some embodiments, the computer system 200 is an ECU, head unit or some other processor-based computing device of the ego vehicle 123 or the remote vehicle 124.

The computer system 200 includes one or more of the following elements according to some examples: the road sign system 199; a processor 225; a communication unit 245; a first onboard external camera 285A; a second onboard external camera 285B; a memory 227; a DSRC-compliant GPS unit 250; an electronic display 240; and a set of ADAS systems 280. The components of the computer system 200 are communicatively coupled by a bus 220.

In the illustrated embodiment, the processor 125 is communicatively coupled to the bus 220 via a signal line 238. The communication unit 245 is communicatively coupled to the bus 220 via a signal line 226. The first onboard external camera 285A is communicatively coupled to the bus 220 via a signal line 241. The second onboard external camera 285B is communicatively coupled to the bus 220 via a signal line 243. The memory 127 is communicatively coupled to the bus 220 via a signal line 242. The sensor set 284 is communicatively coupled to the bus 220 via a signal line 244. The DSRC-compliant GPS unit 150 is communicatively coupled to the bus 220 via a signal line 228. The electronic display 240 is communicatively coupled to the bus 220 via a signal line 246. The set of ADAS systems 280 is communicatively coupled to the bus 220 via a signal line 247.

The processor 225 provides similar functionality as the processor 125 described above with reference to FIG. 1, and so, that description will not be repeated here. The communication unit 245 provides similar functionality as the communication unit 245 described above with reference to FIG. 1, and so, that description will not be repeated here. The first onboard external camera 285A and the second onboard external camera 285B provides similar functionality as the onboard external camera 185 described above with reference to FIG. 1, and so, that description will not be repeated here. The memory 227 provides similar functionality as the memory 127 described above with reference to FIG. 1, and so, that description will not be repeated here. The sensor set 284 provides similar functionality as the sensor set 184 described above with reference to FIG. 1, and so, that description will not be repeated here. The DSRC-compliant GPS unit 250 provides similar functionality as the DSRC-compliant GPS unit 150 described above with reference to FIG. 1, and so, that description will not be repeated here. The electronic display 240 provides similar functionality as the electronic display 140 described above with reference to FIG. 1, and so, that description will not be repeated here. The set of ADAS systems 280 provides similar functionality as the set of ADAS systems 180 described above with reference to FIG. 1, and so, that description will not be repeated here.

The memory 227 may store any of the data described above with reference to FIG. 1 or below with reference to FIGS. 2-6. The memory 227 may store any data needed for the computer system 200 to provide its functionality.

In the illustrated embodiment shown in FIG. 2, the road sign system 199 includes: a communication module 202; and a determination module 204

The communication module 202 can be software including routines for handling communications between the road sign system 199 and other components of the operating environment 100 of FIG. 1.

In some embodiments, the communication module 202 can be a set of instructions executable by the processor 225 to provide the functionality described below for handling communications between the road sign system 199 and other components of the computer system 200. In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the operating environment 100. For example, the communication module 202 receives or transmits, via the communication unit 245, some or all of the digital data stored on the memory 227. The communication module 202 may send or receive any of the digital data or messages described above with reference to FIG. 1, or below with reference to FIGS. 2-6, via the communication unit 245.

In some embodiments, the communication module 202 receives data from components of the road sign system 199 and stores the data in the memory 227 (or a buffer or cache of the memory 227, or a standalone buffer or cache which is not depicted in FIG. 2). For example, the communication module 202 receives the BSM data 197 from the communication unit 245 (which received the BSM data 197 as transmitted by a vehicle that is subject to criminal activity) and stores the BSM data 197 in the memory 227.

In some embodiments, the communication module 202 may handle communications between components of the road sign system 199.

The determination module 204 can be software including routines for executing one or more steps of the method 300 described below with reference to FIG. 3. In some embodiments, the determination module 204 can be software including routines for providing the analysis 400 described below with reference to FIG. 4.

In some embodiments, the determination module 204 can be stored in the memory 227 of the computer system 200 and can be accessible and executable by the processor 225. The determination module 204 may be adapted for cooperation and communication with the processor 225 and other components of the computer system 200 via signal line 224.

The functionality of the determination module 204 of the road sign system 199 is now described with reference to the ego vehicle 123 and the remote vehicle 124 according to some embodiments. In some embodiments, the road sign system 199 includes code and routines that are operable, when executed by the processor 225, to cause the processor 225 to execute one or more of the following steps: (1) causing the sensors set 284 to record sensor data including one or more images of one or more road signs; (2) comparing the sensor data to the sign database to determine the number of road signs in each image (e.g., the number of signs data) and what the content of each sign is (e.g., the content data); (3) building a V2X message including the number of signs data, the content data and the vehicle ID data for the vehicle whose road sign system 199 that is executing this step (this may be the ego vehicle 123 or the remote vehicle 124 as steps 1-3 are executed by each of the ego vehicle 123 and the remote vehicle 124); (4) broadcasting the V2X message to other vehicles (e.g., the remote vehicle 124 broadcasts the V2X message which is received by the ego vehicle 123); (5) receiving V2X messages from other vehicles which includes their own number of signs data, content data and vehicle ID data (e.g., the ego vehicle 123 receives a plurality of V2X messages from a plurality of remote vehicles 124); (6) for each V2X message, determining a weight to be assigned to the content data included in the V2X message based on the vehicle ID data included in each V2X message and the weight for this vehicle ID data as described by the vehicle model database; (6) assigning the weight to each particular instance of content data based on the vehicle ID data for the vehicle that transmitted the V2X message including this particular instance of content data; (7) determining the presence of a cluster of vehicles having the same vehicle ID and decreases their weight (e.g., by 90%) if a cluster is identified (e.g., a cluster may include a group of vehicles which is greater than 50% of the vehicles that provided V2X messages in a given time interval; here 50% is an example of a threshold used to determine whether a cluster of vehicles of the same make and model is present during a time interval); (8) for each road sign, determining the weights of each unique content data result and then sum the weights to determine which unique content data result has the highest weight score (e.g., eight instances of content data say that a sign says "60 mph" whereas six instances of content data say that the same sign says "80 mph;" the group with 80 mph as the content data generally comes from vehicles having better quality image sensors, and so the weight for this group is higher even though a higher number of vehicles determined that the road sign said "60 mph."); and (9) determining the content of the road sign based whichever unique content data result has the highest weight score.

Example Processes and Analysis

FIG. 3 depicts a method 300 determining the content of a road sign according to some embodiments. The steps of the method 300 are executable in any order, and not necessarily the order depicted in FIG. 3.

At step 301, a sensor set is executed to cause the sensor set to record sensor data including one or more images of one or more road signs.

At step 303, the sensor data is compared to the sign database to determine the number of road signs in each image (e.g., the number of signs data) and what the content of each sign is (e.g., the content data).

At step 305, a V2X message is built and broadcast. The V2X message includes the number of signs data, the content data and the vehicle ID data for the vehicle whose road sign system that is executing this step. For example, a remote vehicle executes steps 301, 303 and 305 and the V2X message includes the vehicle ID data describing the make and model of the remote vehicle.

In some embodiments, the remote vehicle then broadcasts the V2X message. An ego vehicle then receives the V2X message. The ego vehicle then executes steps 307-314. However, it is to be understood that the ego vehicle also executes steps 301-305 so that the ego vehicle also builds and broadcasts its own V2X message for the benefit of remote vehicles that are within V2X transmission range of the ego vehicle.

At step 307, one or more V2X messages are received from other vehicles. These V2X messages include their own number of signs data, content data and vehicle ID data. For example, the ego vehicle receives a plurality of V2X messages from a plurality of remote vehicles, and each V2X message includes its own instance of number of signs data, content data and vehicle ID data for the remote vehicle that transmitted the V2X message. In some embodiments, for each V2X message received, road sign system determines a weight to be assigned to the content data included in the V2X message based on the vehicle ID data included in each V2X message and the weight for this vehicle ID data as described by the vehicle model database.

At step 308, a weight is assigned to each particular instance of content data received in a V2X message based on the vehicle ID data included in the V2X message that also included this particular instance of content data.

At step 309, a determination is made regarding whether a cluster of cluster of vehicles having the same vehicle ID is present. If a cluster is present, then the weight assigned to the content data for the vehicles included in the cluster is decreased by some value which is less than 100% (e.g., by 90%). For example, a cluster may include a group of vehicles which is greater than 50% of the vehicles that provided V2X messages in a given time interval; here 50% is an example of a threshold used to determine whether a cluster of vehicles of the same make and model is present during a time interval. The road sign system may include digital data that describes the threshold used to identify whether a cluster is present. If the threshold is satisfied, then the road sign system determines that a cluster is present and decreases the weight assigned to the vehicles included in the cluster.

At step 310, determining, for each road sign, the weights of each unique content data result and then summing the weights to determine which unique content data result has the highest weight score. An example of step 310 is depicted in sub-step 311. At sub-step 311, eight instances of content data indicate that a road sign says "60 mph" whereas six instances of content data say that the same road sign says "80 mph." The group with 80 mph as the content data generally comes from vehicles having better quality image sensors, and so the weight for this group is higher even though a higher number of vehicles determined that the road sign said "60 mph." According, the road sign system does not apply a majority rule.

At step 312, the content of a road sign is determined based on whichever unique content data result has the highest weight score at step 310.

At step 314, digital data describing the content of the road sign is provided to an ADAS system or electronic display of the vehicle.

Referring now to FIG. 4, depicted is a block diagram illustrating an example analysis 400 provided by the road sign system 199 according to some embodiments.

In some embodiments, the road sign system 199 includes code and routines which, when executed by a processor 225 of the vehicle, causes the processor 225 to provide the functionality described above with regard to the road sign system 199. FIG. 4 depicts examples of formulas which are implemented by the code and routines of the road sign system 199 to provide this functionality in some embodiments.

Referring now to FIG. 5, depicted is a block diagram illustrating an example of the BSM data 197 according to some embodiments.

The regular interval for transmitting BSMs may be user configurable. In some embodiments, a default setting for this interval may be transmitting the BSM every 0.10 seconds or substantially every 0.10 seconds.

A BSM is broadcasted over the 5.9 GHz DSRC band. DSRC range may be substantially 1,000 meters. In some embodiments, DSRC range may include a range of substantially 100 meters to substantially 1,000 meters. DSRC range is generally 300 to 500 meters depending on variables such as topography and occlusions between DSRC-equipped endpoints. In some embodiments, one or more of the vehicles 123, 124 depicted in FIG. 1 and the V2X-connected device 122 depicted in FIG. 1 are DSRC-equipped endpoints.

Referring now to FIG. 6, depicted is a block diagram illustrating an example of BSM data 197 according to some embodiments.

A BSM may include two parts. These two parts may include different BSM data 197 as shown in FIG. 6.

Part 1 of the BSM data 197 may describe one or more of the following: the GPS data of the vehicle; vehicle heading; vehicle speed; vehicle acceleration; vehicle steering wheel angle; and vehicle size.

Part 2 of the BSM data 197 may include a variable set of data elements drawn from a list of optional elements. Some of the BSM data 197 included in Part 2 of the BSM are selected based on event triggers, e.g., anti-locking brake system ("ABS") being activated may trigger BSM data 197 relevant to the ABS system of the vehicle.

In some embodiments, some of the elements of Part 2 are transmitted less frequently in order to conserve bandwidth.

In some embodiments, the BSM data 197 included in a BSM includes current snapshots of a vehicle.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method that is executed by an onboard vehicle computer system of an ego vehicle, the method comprising:
   determining first content data from a first set of vehicles that describes content for a road sign;
   determining second content data from a second set of vehicles that describes the content for the road sign; and
   accepting the second content data as describing the content of the road sign based, at least in part, on a number of vehicles in the first set of vehicles having a same make and model exceeding a threshold value.

2. The method of claim 1, further comprising:
   assigning a first weight to the first content data based on the number of vehicles in the first set of vehicles exceeding the threshold value; and
   assigning a second weight to the second content data based on a number of vehicles in the second set of vehicles failing to have the same make and model;
   wherein accepting the second content data as describing the content of the road sign is further based on the second weight being greater than the first weight.

3. The method of claim 2, further comprising:
   determining a presence of a cluster of vehicles in the first set of vehicles having the same make and model responsive to the number of vehicles in the first set of vehicles exceeding the threshold value; and
   lowering the first weight based on determining the presence of the cluster.

4. The method of claim 1, wherein the ego vehicle is included in the first set of vehicles.

5. The method of claim 1, wherein the ego vehicle included in the second set of vehicles.

6. The method of claim 1, wherein the ego vehicle receives a Vehicle-to-Anything (V2X) message transmitted by a remote vehicle that includes sensor data that includes an image of the road sign.

7. The method of claim 6, further comprising determining that the content for the road sign is the second content data based at least in part on the image of the road sign.

8. The method of claim 6, wherein determining the first content data includes determining a type of road sign or a rule described by the road sign.

9. The method of claim 1, further comprising:
   receiving sensor data from the first set of vehicles and the second set of vehicles, wherein the sensor data includes images of the road sign; and
   comparing the sensor data to a sign database, wherein determining the first content data and the second content data is based on comparing the sensor data to the sign database.

10. An onboard vehicle computer system of an ego vehicle comprising:
    a processor communicatively coupled to a non-transitory memory that stores computer code that is operable, when executed by the processor, to cause the processor to:
      determine first content data from a first set of vehicles that describes content for a road sign;
      determine second content data from a second set of vehicles that describes the content for the road sign; and
      accept the second content data as describing the content of the road sign based, at least in part, on a number of vehicles in the first set of vehicles having a same make and model exceeding a threshold value.

11. The system of claim 10, wherein the non-transitory memory stores additional computer code that is operable, when executed by the processor, to cause the processor to:
    assign a first weight to the first content data based on the number of vehicles in the first set of vehicles exceeding the threshold value; and
    assign a second weight to the second content data based on a number of second vehicles in the second set of vehicles failing to have the same make and model;
    wherein accepting the second content data as describing the content of the road sign is further based on the second weight being greater than the first weight.

12. The system of claim 11, wherein the non-transitory memory stores additional computer code that is operable, when executed by the processor, to cause the processor to:
    determine a presence of a cluster of vehicles in the first set of vehicles having the same make and model responsive to the number of vehicles in the first set of vehicles exceeding the threshold value; and
    lower the first weight based on determining the presence of the cluster.

13. The system of claim 10, wherein the ego vehicle is included in the first set of vehicles.

14. The system of claim 10, wherein the ego vehicle included in the second set of vehicles.

15. The system of claim 12, further comprising a Vehicle-to-Anything (V2X) radio communicatively coupled to the processor, wherein the V2X radio is operable to receive a V2X message transmitted by a remote vehicle that includes sensor data that includes an image of the road sign.

16. The system of claim 15, wherein determining the first content data includes determining a type of road sign or a rule described by the road sign.

17. A non-transitory computer program product that is an element of an onboard system of an ego vehicle comprising instructions that, when executed by one or more processors, cause the one or more processors to perform operations comprising:
   determining first content data from a first set of vehicles that describes content for a road sign;
   determining second content data from a second set of vehicles that describes the content for the road sign; and
   accepting the second content data as describing the content of the road sign based, at least in part, on a number of vehicles in the first set of vehicles having a same make and model exceeding a threshold value.

18. The computer program product of claim 17, wherein the operations further comprise:
   assigning a first weight to the first content data based on the number of vehicles in the first set of vehicles exceeding the threshold value; and
   assigning a second weight to the second content data based on a number of second vehicles in the second set of vehicles failing to have the same make and model;
   wherein accepting the second content data as describing the content of the road sign is further based on the second weight being greater than the first weight.

19. The computer program product of claim 17, wherein the ego vehicle includes an Advanced Driver Assistance System (ADAS system) and the ADAS system of the ego vehicle receives digital data describing the determination of the second content data of the road sign generated by the computer program product and uses the determination of the second content data of the road sign to control an ADAS function of the ego vehicle.

20. The computer program product of claim 17, wherein the ego vehicle is an autonomous vehicle and the onboard system of the autonomous vehicle receives digital data describing the determination of the second content data of the road sign generated by the computer program product and uses the determination of the second content data of the road sign to autonomously control an operation of the autonomous vehicle.

* * * * *